United States Patent
Elsarelli et al.

(10) Patent No.: US 9,815,389 B2
(45) Date of Patent: Nov. 14, 2017

(54) ADJUSTMENT DEVICE FOR ADJUSTING A LONGITUDINAL POSITION OF A VEHICLE SEAT

(71) Applicant: Brose Fahrzeugteile GmbH & Co. Kommanditgesellschaft, Coburg, Coburg (DE)

(72) Inventors: James Elsarelli, Leonard, MI (US); Adam Coulston, Rochester Hills, MI (US)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 14/965,676

(22) Filed: Dec. 10, 2015

(65) Prior Publication Data

US 2017/0166090 A1    Jun. 15, 2017

(51) Int. Cl.
*B60N 2/06* (2006.01)
*B60N 2/075* (2006.01)
*B60N 2/07* (2006.01)

(52) U.S. Cl.
CPC ............ *B60N 2/067* (2013.01); *B60N 2/073* (2013.01); *B60N 2/075* (2013.01); *B60N 2/0722* (2013.01)

(58) Field of Classification Search
CPC .. B60N 2/0715; B60N 2/0705; B60N 2/0818; B60N 2/0825; B60N 2/067;
(Continued)

(56) References Cited

U.S. PATENT DOCUMENTS 6,915,998 B2   7/2005  Borbe et al.
7,048,244 B2 *  5/2006  Hauck ................ B60N 2/0232
                                                248/430
(Continued)

FOREIGN PATENT DOCUMENTS

CN     1843803 A    10/2006
CN   101178116 A     5/2008
(Continued)

OTHER PUBLICATIONS

English translation of IPRP of corresponding International application PCT/EP2010/067321, dated Aug. 14, 2012, 9 pages.
(Continued)

*Primary Examiner* — Steven Marsh
(74) *Attorney, Agent, or Firm* — Lewis Roca Rothgerber Christie LLP

(57) ABSTRACT

An adjustment device for adjusting a longitudinal position of a vehicle seat, comprises: a first guide rail; a spindle fixed to the first guide rail and extending along a longitudinal axis; a second guide rail being linearly movable along the longitudinal axis with respect to the first guide rail, the second guide rail having a base and a first leg extending from the base; and a gearing fixed to the second guide rail and having a housing, the gearing being in operative connection with the spindle to move the second guide rail relative to the first guide rail. At least one support member is arranged on the second guide rail, the at least one support member having a support face extending transversely to the longitudinal axis and facing the housing of the gearing for supporting the gearing with respect to the second guide rail. The support face comprises a first edge facing the base or the first leg and having a welding section via which the first edge is fixed to the base or the first leg by welding, a tab protruding from
(Continued)

said first edge and engaging with an opening of said base or said first leg.

12 Claims, 8 Drawing Sheets

(58) Field of Classification Search
CPC .. B60N 2/0232; B60N 2/0843; B60N 2/0875; B60N 2/123; B60N 2/06; B60N 2/085; B60N 2/0732; B60N 2/0887; B60N 2/072; B60N 2/071
USPC .......................................... 248/424, 429, 430
See application file for complete search history.

(56) References Cited

U.S. PATENT DOCUMENTS

| | | | |
|---|---|---|---|
| 7,051,986 | B1 | 5/2006 | Taubmann et al. |
| 2004/0206878 | A1 | 10/2004 | Borbe et al. |
| 2005/0082890 | A1 | 4/2005 | Taubmann et al. |
| 2006/0150758 | A1 | 7/2006 | Wohrle et al. |
| 2006/0158002 | A1 | 7/2006 | Long |
| 2006/0213302 | A1 | 9/2006 | Hoffmann et al. |
| 2006/0249644 | A1 | 11/2006 | Folliot et al. |
| 2007/0108360 | A1* | 5/2007 | Ito ........................ B60N 2/067 248/424 |
| 2008/0105810 | A1 | 5/2008 | Hofschulte et al. |
| 2008/0282822 | A1 | 11/2008 | Birker et al. |
| 2010/0133408 | A1 | 6/2010 | Umezaki et al. |
| 2010/0320352 | A1* | 12/2010 | Weber .................. B60N 2/067 248/429 |
| 2012/0325033 | A1 | 12/2012 | Bosecker et al. |

FOREIGN PATENT DOCUMENTS

| | | |
|---|---|---|
| DE | 1755740 | 1/1972 |
| DE | 19815283 C2 | 10/1999 |
| DE | 19942973 A1 | 3/2001 |
| DE | 10139631 A1 | 3/2003 |
| DE | 19861100 B4 | 9/2004 |
| DE | 10230514 B4 | 10/2004 |
| DE | 10337475 A1 | 3/2005 |
| DE | 10353245 A1 | 6/2005 |
| DE | 10-2006-011718 A1 | 10/2006 |
| DE | 10-2006-049807 A1 | 4/2008 |
| DE | 10-2006-049809 A1 | 4/2008 |
| DE | 10-2007-023329 A1 | 11/2008 |
| DE | 20-2007-011851 U1 | 2/2009 |
| DE | 10-2007-059744 A1 | 6/2009 |
| DE | 10-2006-011717 B4 | 6/2010 |
| EP | 0759374 A2 | 2/1997 |
| EP | 1442923 A2 | 8/2004 |
| EP | 1 679 223 B1 | 7/2006 |
| EP | 2070761 A2 | 6/2009 |
| FR | 2872747 A1 | 1/2006 |
| FR | 2882975 | 9/2006 |
| FR | 2908698 A1 | 5/2008 |
| FR | 2 926 263 | 7/2009 |
| FR | 2926264 A1 | 7/2009 |
| JP | 02-296543 A | 12/1990 |
| JP | 04-057436 | 5/1992 |
| JP | 05-037553 | 5/1993 |
| JP | 2006-290131 A | 10/2006 |
| JP | 2007-510099 A | 4/2007 |
| WO | WO 2009-092946 A2 | 7/2009 |

OTHER PUBLICATIONS

English translation of Japanese Examination Report for Application No. 2012-552275, dated Nov. 4, 2014, 2 pages.
Czech Search Report dated Mar. 26, 2013 for Application No. PV 2012-546, 2 sheets.
Chinese Office action for Application No. CN 201080066121.6, dated Jul. 1, 2014, 11 pages and English translation of the Summary of the First Office Action for Application No. CN 201080066121.6, 3 sheets.

* cited by examiner

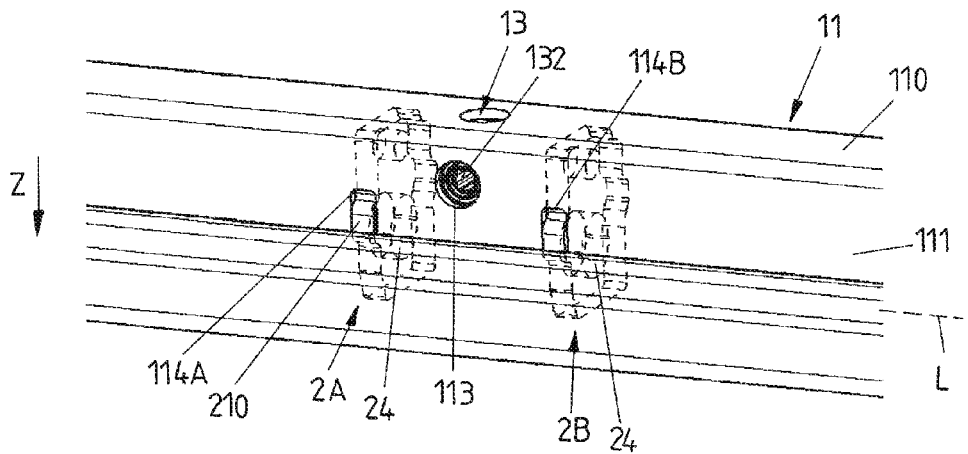
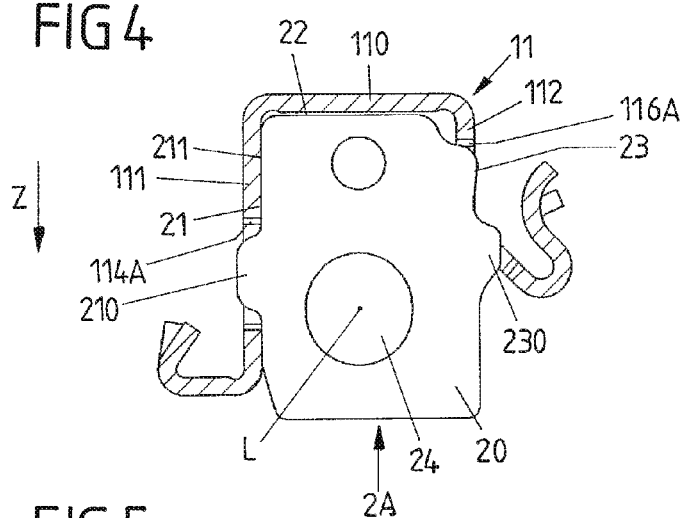
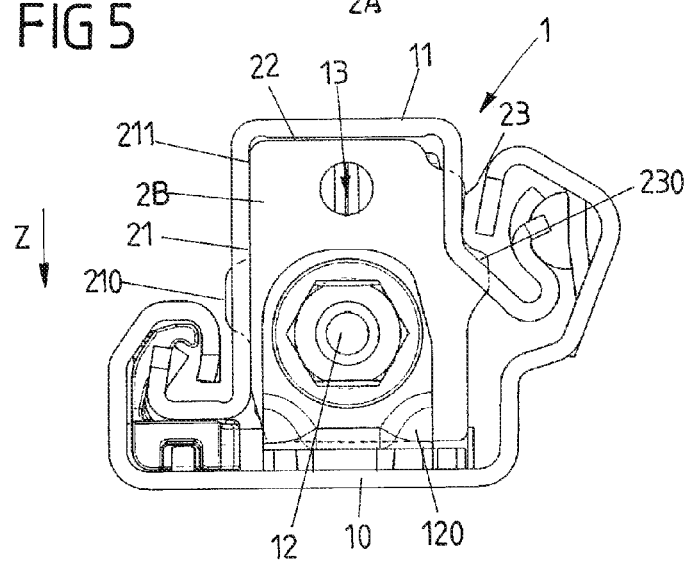

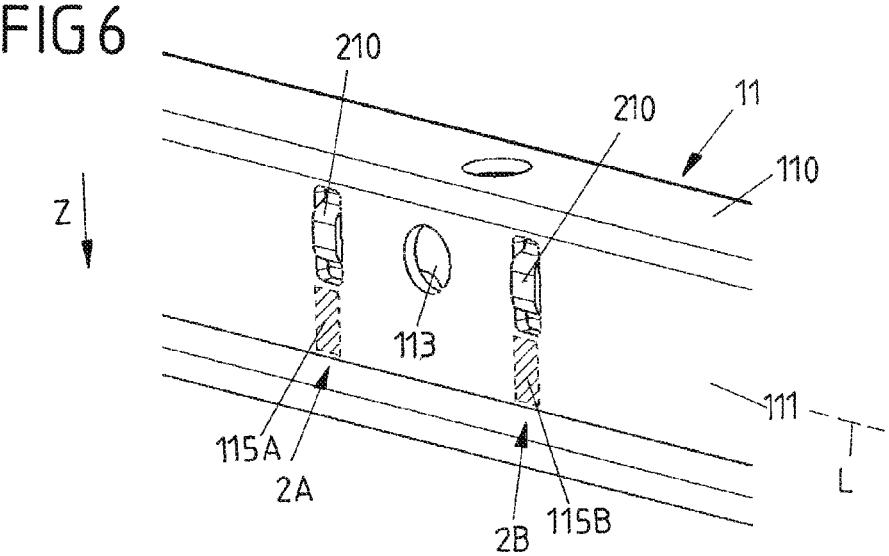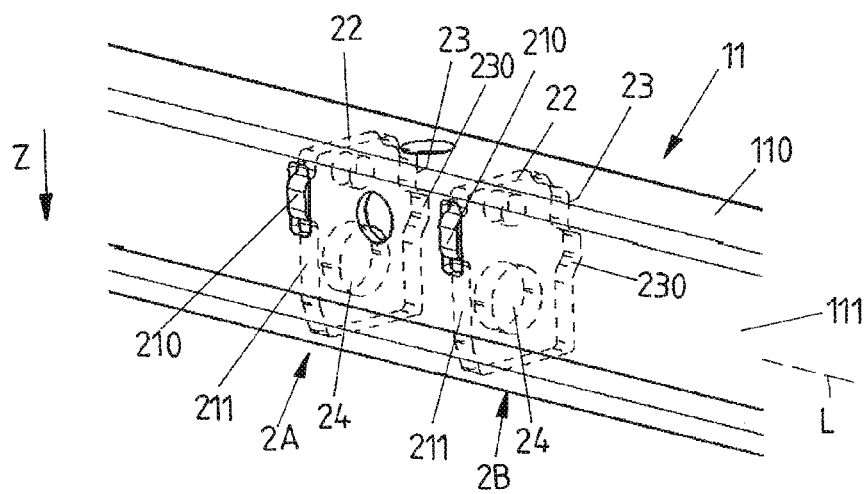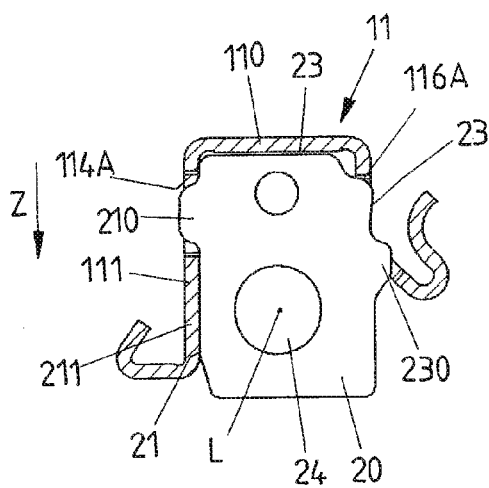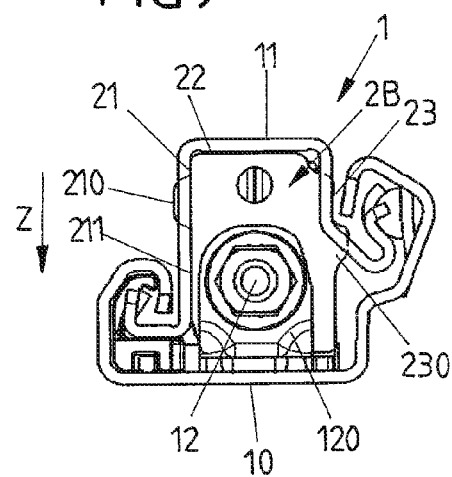

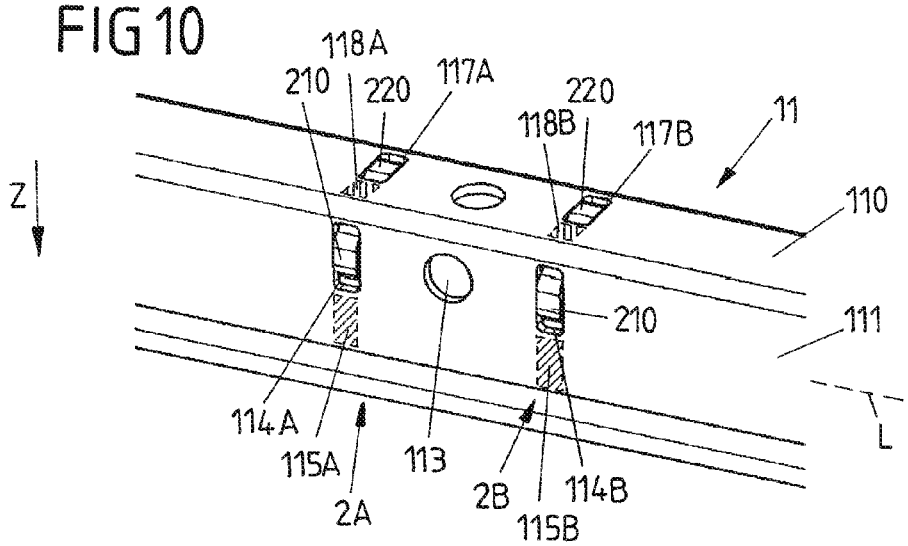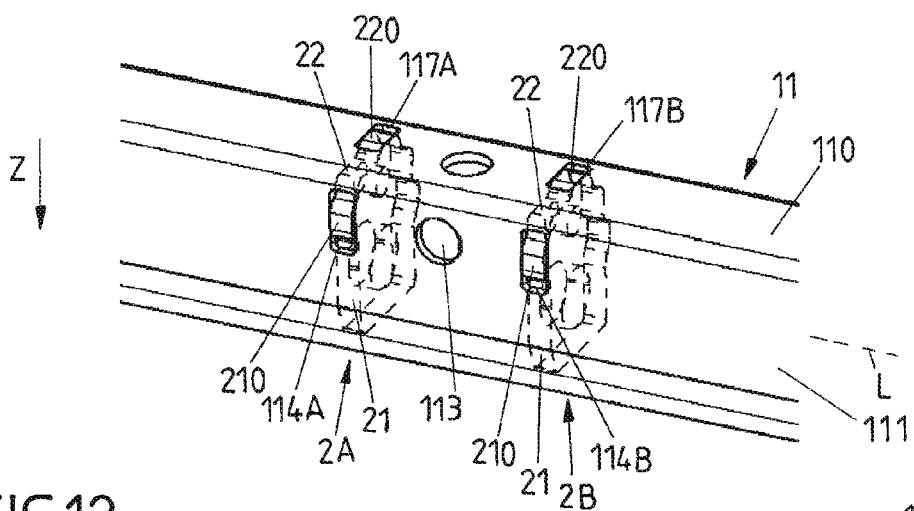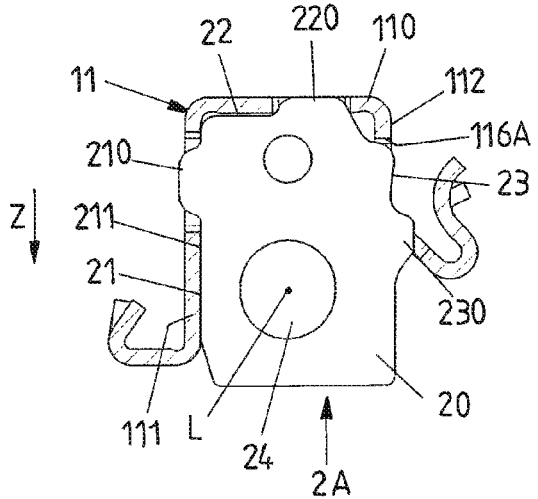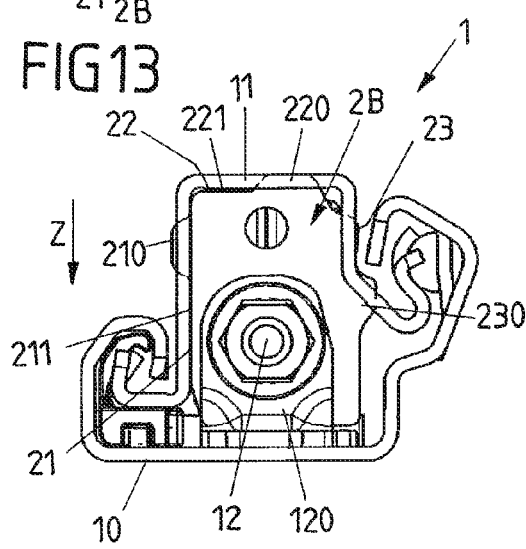

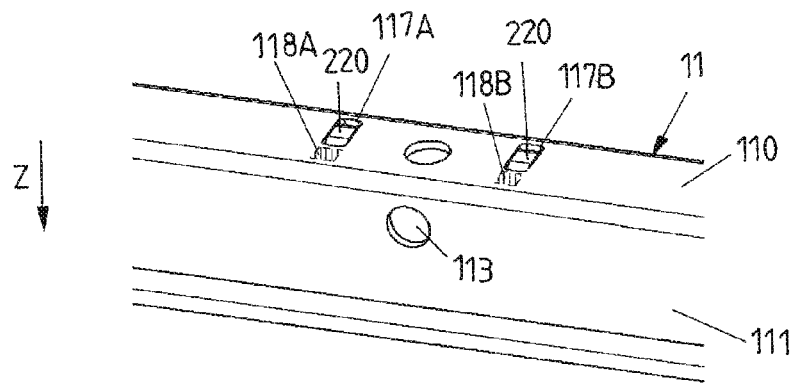
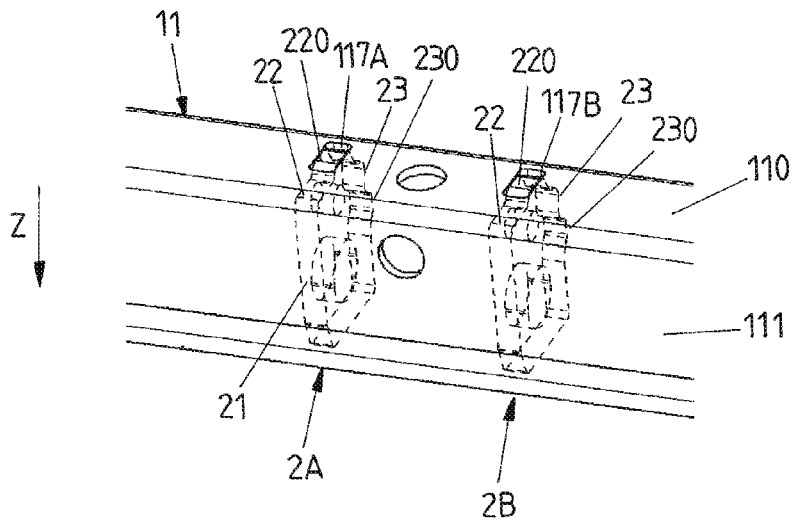
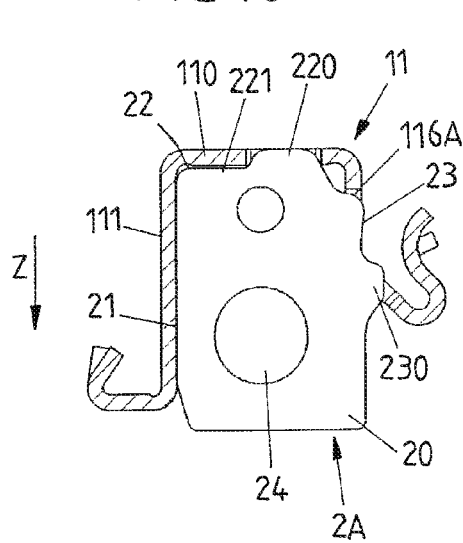
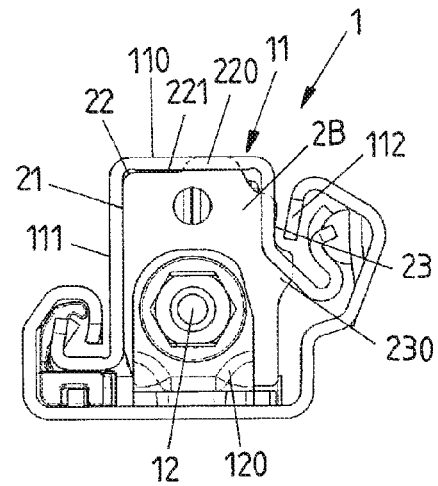

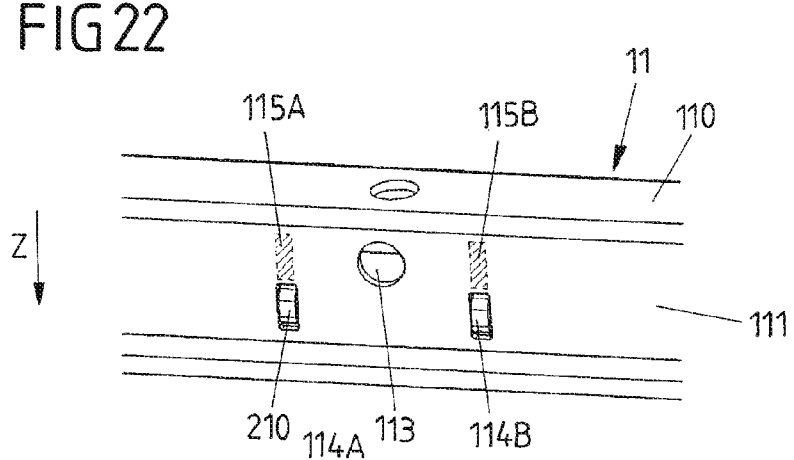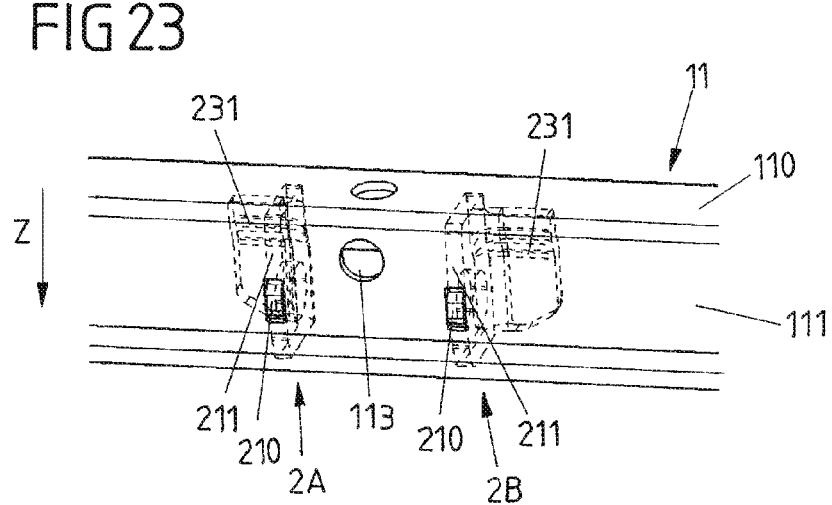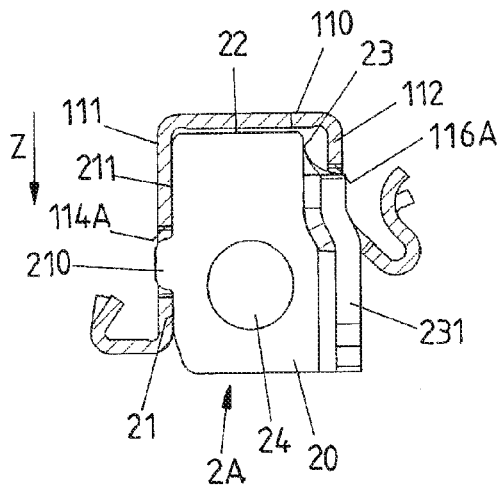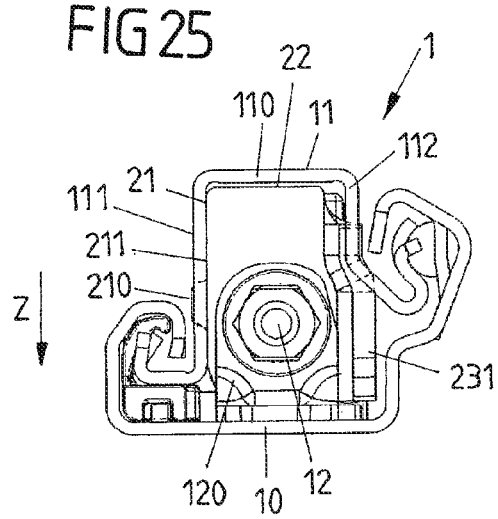

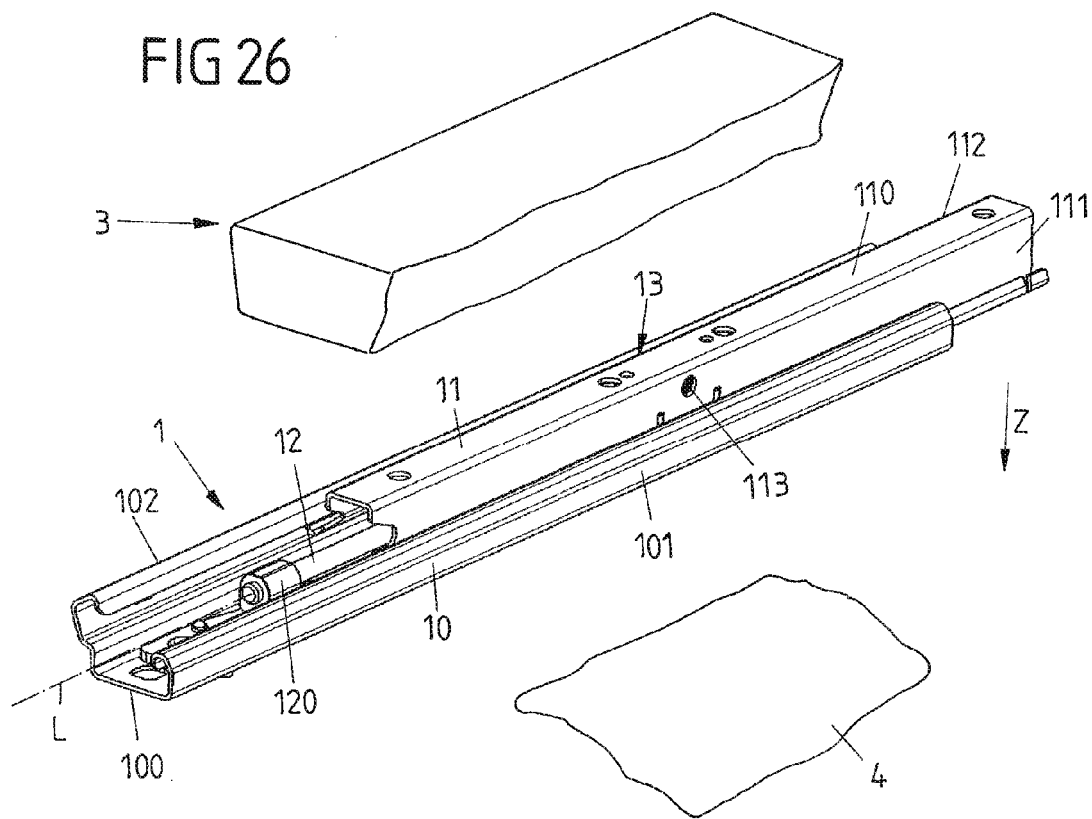
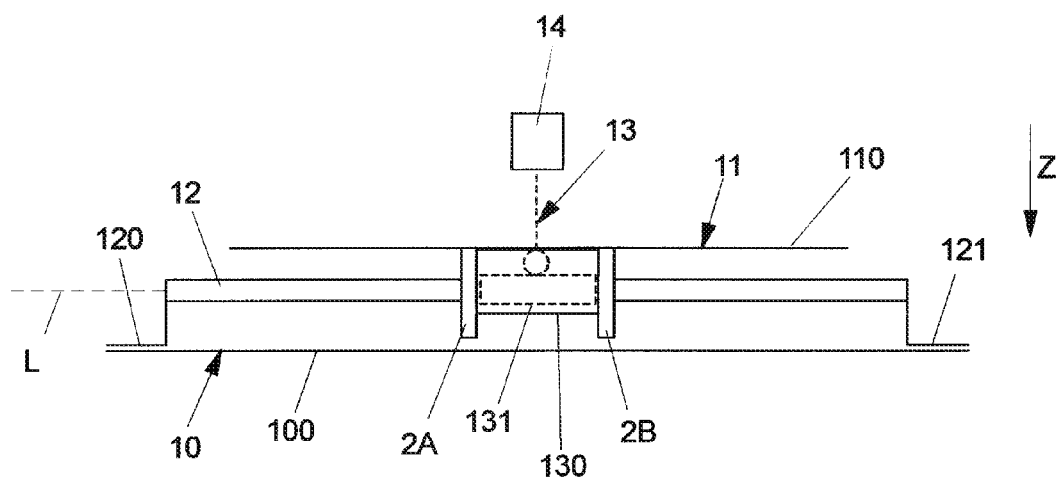

ADJUSTMENT DEVICE FOR ADJUSTING A LONGITUDINAL POSITION OF A VEHICLE SEAT

TECHNICAL FIELD

The invention relates to an adjustment device for adjusting a longitudinal position of a vehicle seat.

BACKGROUND

Within a vehicle the position of a vehicle seat can be adjusted by means of an adjustment device comprising guide rails, an upper guide rail being slidably arranged on a lower guide rail such that the vehicle seat connected to the upper guide rail can be adjusted in its longitudinal position within the vehicle by sliding the upper guide rail along the lower guide rail for example connected to a vehicle floor.

An adjustment device of this kind may for example comprise a spindle fixed to one of the guide rails and being in operative connection with a gearing fixed to the other guide rail. The gearing for example comprises a spindle nut driven by an electric drive device such that by rotating the spindle nut with respect to the spindle the gearing (and together with the gearing the guide rail the gearing is connected to) can be moved longitudinally along the spindle.

The guide rails of the adjustment device hence are held in position with respect to each other via the gearing being in operative connection with the spindle. The gearing herein is fixed to the guide rail and it is associated with such that forces can be transferred from the gearing to the guide rail and from the guide rail to the vehicle seat in order to adjust the position of the vehicle seat.

The fixation of the gearing to the associated guide rail must be designed such that the gearing is reliably held in place with respect to the associated guide rail even in case large loads act onto the vehicle seat, for example in case of a vehicle crash.

For this, typically the gearing is supported with respect to the associated guide rail by means of one or multiple support members, for example constituted as a bracket substantially enclosing a housing of the gearing or constituted as a plate member providing a support face for supporting the housing of the gearing with respect to the guide rail.

There is a desire to provide an adjustment device having one or multiple support members which provide for a strong, reliable support for the gearing with respect to the guide rail it is associated with, and at the same time are easy to manufacture and to assemble on the guide rail.

SUMMARY OF THE INVENTION

It is an object to provide an adjustment device for adjusting a longitudinal position of a vehicle seat which is easy to manufacture, can reliably withstand also large loads for example in case of a crash and at the same time may exhibit beneficial characteristics during operation.

In one aspect, an adjustment device for adjusting a longitudinal position of the vehicle seat is provided, the adjustment device comprising: a first guide rail; a spindle fixed to the first guide rail and extending along a longitudinal axis; a second guide rail being linearly movable along the longitudinal axis with respect to the first guide rail, the second guide rail having a base and a first leg extending from the base; a gearing fixed to the second guide rail and having a housing, the gearing being in operative connection with the spindle to move the second guide rail relative to the first guide rail; at least one support member arranged on the second guide rail, the at least one support member having a support face extending transversely to the longitudinal axis and facing the housing of the gearing for supporting the gearing with respect to the second guide rail; wherein the support face comprises a first edge facing the base or the first leg and having a welding section via which the first edge is fixed to the base or the first leg by welding, a tab protruding from said first edge and engaging with an opening of said base or said first leg.

In one embodiment, the adjustment device comprises two support members which are displaced with respect to each other along the longitudinal axis and receive the gearing in between themselves. The gearing hence is held in between the two separate support members with respect to the second guide rail, one support member being arranged on a first side of the gearing and another, second support member being arranged on a second side of the gearing.

The at least one support member is arranged on the second guide rail. Herein, the at least one support member has a support face extending transversely to the longitudinal axis and facing the housing of the gearing for supporting the gearing with respect to the second guide rail. The support face comprises a first edge adjacent to the base or the first leg of the second guide rail, wherein the support member abuts, at the first edge, the base or the first leg and at the same time engages with an opening in the base or the first leg by means of a tab protruding from the first edge. The support member hence is connected at the first edge to the base or the first leg in a twofold manner, namely by welding and, in addition, by engagement of a tab with an opening of the base or the first leg. By means of the engagement the connection of the support member to the base or the first leg is additionally strengthened such that shearing forces during operation, in particular in case of a vehicle crash, may not impact the welded connection between the support member and the associated guide rail.

In one embodiment, the welding section of the first edge is fixed to the base or the first leg by laser welding. In particular, a laser welding seam may be generated in between the base or the first leg of the guide rail and the support member from the outside of the guide rail by welding through the base or the first leg, and hence by directing a laser welding beam from the outside onto the base or the first leg in order to weld the support member to the inside of the base of the first leg.

In one embodiment, the tab protruding from the first edge is, via the opening in the base or the first leg, in a positive locking engagement with the base or the first leg. Hence, the support member, by engaging the opening of the base or the first leg, abuts the base or the first leg and is supported along the longitudinal direction by the base or the first leg.

In one embodiment, the first edge faces the first leg of the second guide rail, the welding section of the first edge being fixed to the first leg by welding, for example laser welding, and the tab protruding from the first edge engaging with an opening of the first leg. Herein, in one embodiment, the welding section of the first edge and the tab protruding from the first edge are displaced with respect to each other along a vertical direction extending transversely to the longitudinal direction and transversely to the base. The tap and the welding section hence are displaced with respect to each other such that the first edge at different locations is connected to the first leg on the one hand by welding and on the other hand in a positive locking manner.

In one embodiment, the support face comprises a second edge facing the base, wherein in a first embodiment the second edge is arranged with respect to the base such that a gap is formed in between the second edge and the base. Hence, the second edge comprises a clearance with respect to the base such that the support member is not in contact with the base and hence is not fixed to the base. This may provide the advantage that the stiffness characteristics of the guide rail are not changed, the guide rail hence having a substantial elasticity and may at least to some extent be flexible during operation. This may have a beneficial effect during operation and may in particular help to avoid the generation of unwanted acoustic noise.

In another, alternative embodiment the second edge may have a welding section via which the second edge is fixed to the base by welding, wherein in addition a tab protrudes from the second edge and engages with an opening of the base. Hence, the support member via the second edge of the support face is connected to the base such that an additional connection of the support member to the guide rail is established. This may add to the strength of the connection between the support member and the guide rail.

The welding connection between the second edge and the base may be established also by laser welding, for example by generating a laser welding seam in between the second edge and the base at the welding section of the second edge by directing a laser welding beam from the outside onto the base in order to generate the laser welding seam at the inside of the base for connecting the support member to the base.

In another aspect, the second guide rail comprises a second leg extending from the base in parallel to the first leg. The guide rail hence comprises a general U shape, with two legs extending from a base and forming an inner space in-between them in which the gearing is received and fixed to the guide rail by means of the at least one support member.

In one embodiment, the second leg comprises an opening, wherein the support face comprises a third edge facing the second leg and engaging with the opening of the second leg. Via the third edge, hence, an additional support of the at least one support member with the guide rail is provided in that the support member at the third edge engages with an opening of the second leg of the guide rail.

Herein, in one embodiment, the third edge, viewed along the longitudinal axis, rests in said opening of the second leg with a play such that the third edge does not abut the second leg in a state of normal operation of the adjustment device, but only comes into contact with the second leg in a state of abnormal load, in particular in case of a vehicle crash. Hence, during normal operation there is no abutment of the support member to the second leg of the guide rail. Rather, the support member at the third edge has a clearance in the opening of the second leg and is not in contact with the second leg. In case of an abnormal load, for example in case of a vehicle crash, forces may however lead to a deformation of the guide rail and/or the support member such that the support member at the third edge comes into contact with the second leg and hence is supported on the second leg. Via the third edge, hence, an end stop is provided to strengthen the connection of the support member to the guide rail in particular in case of a crash.

Because the support member during normal operation is not in contact with the second leg of the guide rail, the stiffness characteristics of the guide rail are not substantially altered during normal operation, allowing for a flexible deformation of the guide rail during operation, which may be beneficial in order to avoid the generation of unwanted noise during normal operation of the adjustment device.

In one embodiment, a tab protrudes from the third edge and engages with the opening of the second leg.

In an alternative embodiment the support member comprises a planar section extending from the third edge in parallel to the support face and engaging with said opening of the second leg. The support member hence has a general L shape, with the support face extending transversely to the longitudinal axis and the planar section extending perpendicularly to the support face and engaging with the opening of the second leg.

In one embodiment, the tab or the planar section are arranged in the opening of the second leg with a clearance such that, during normal operation, the tab or the planar section are not in contact with the second leg.

BRIEF DESCRIPTION OF THE DRAWINGS

The various features and advantages of the present invention may be more readily understood with reference to the following detailed description and the embodiments shown in the drawings. Herein.

FIG. 3 shows another partially transparent view of the first embodiment;

FIG. 4 shows a sectional view of the first embodiment;

FIG. 5 shows a view into the adjustment device of the first embodiment, viewed along the longitudinal axis;

FIG. 6 shows a perspective view of a second embodiment of an adjustment device;

FIG. 7 shows a partially transparent view of the second embodiment;

FIG. 8 shows a sectional view of the second embodiment;

FIG. 9 shows a view into the adjustment device of the second embodiment, viewed along the longitudinal axis;

FIG. 10 shows a perspective view of a third embodiment of an adjustment device;

FIG. 11 shows a partially transparent view of the third embodiment;

FIG. 12 shows a sectional view of the third embodiment;

FIG. 13 shows a view into the adjustment device of the third embodiment, viewed along the longitudinal axis;

FIG. 14 shows a perspective view of a forth embodiment of an adjustment device;

FIG. 15 shows a partially transparent view of the forth embodiment:

FIG. 16 shows a sectional view of the forth embodiment;

FIG. 17 shows a view into the adjustment device of the forth embodiment, viewed along the longitudinal axis;

FIG. 22 shows a perspective view of a sixth embodiment of an adjustment device;

FIG. 23 shows a partially transparent view of the sixth embodiment;

FIG. 24 shows a sectional view of the sixth embodiment;

FIG. 25 shows a view into the adjustment device of the sixth embodiment;

FIG. 26 shows a perspective view of an embodiment of an adjustment device adapted to longitudinally adjust the position of a vehicle seat; and FIG. 27 shows a schematic view of the functional operation of the adjustment device.

DETAILED DESCRIPTION

Figure 1:
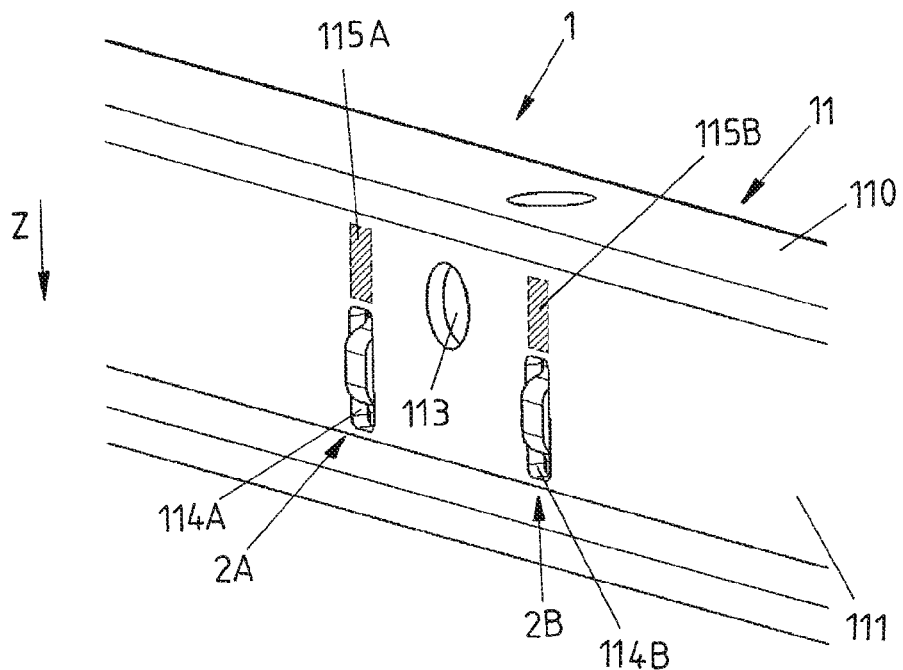
FIG. 1 shows a perspective view of a first embodiment of an adjustment device.
Figure 2:
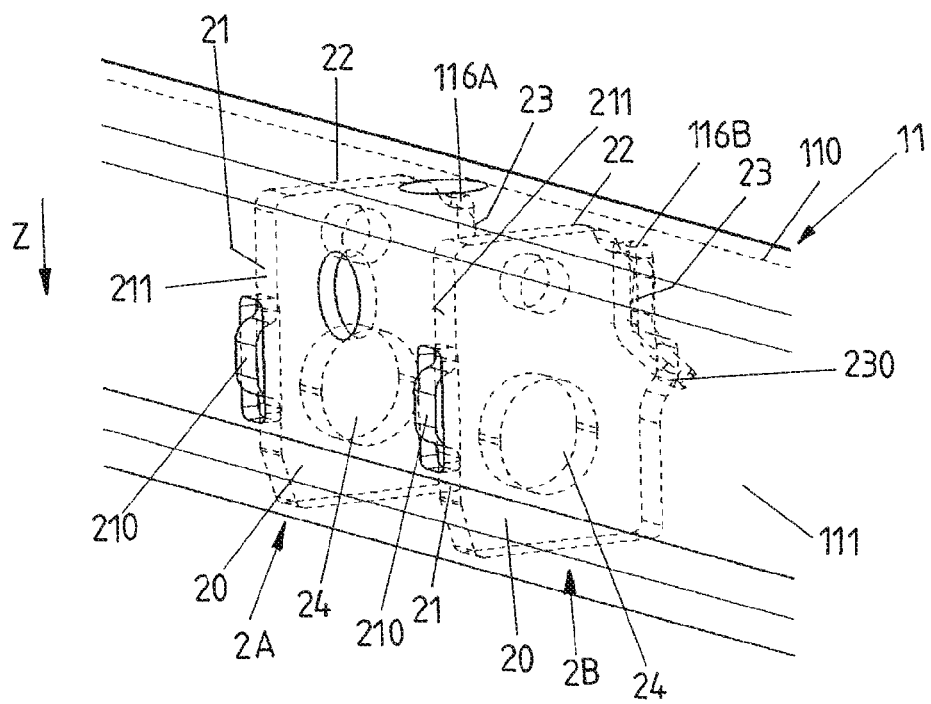
FIG. 2 shows a partially transparent view of the first embodiment.
Figure 18:
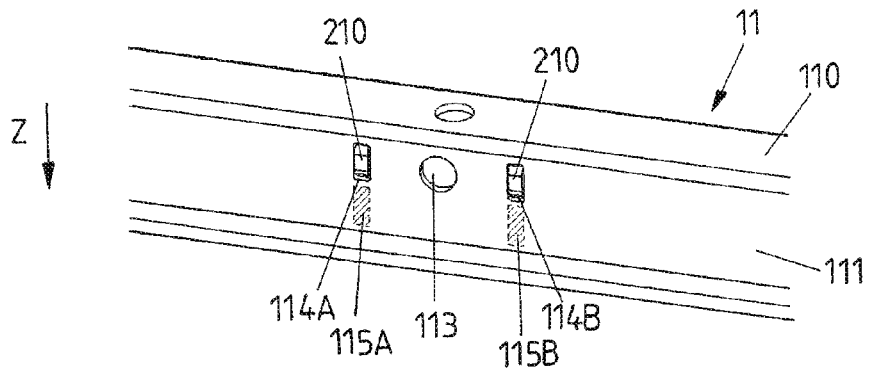
FIG. 18 shows a perspective view of a fifth embodiment of an adjustment device.
Figure 19:
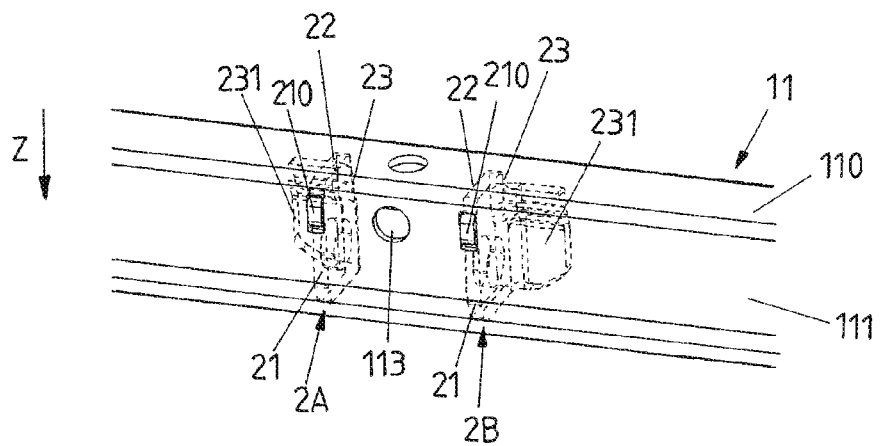
FIG. 19 shows a partially transparent view of the fifth embodiment.
Figure 20:
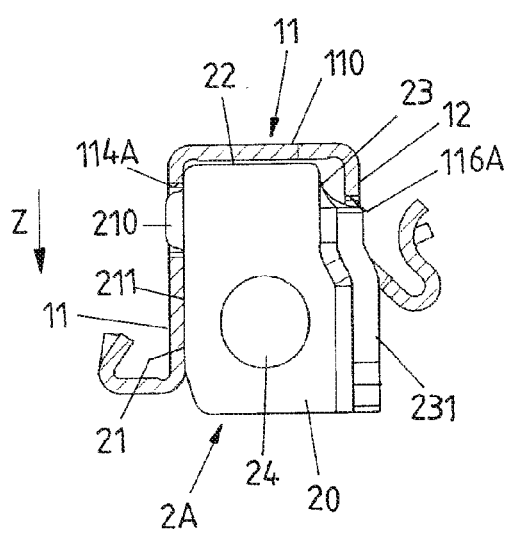
FIG. 20 a shows a sectional view of the fifth embodiment.
Figure 21:
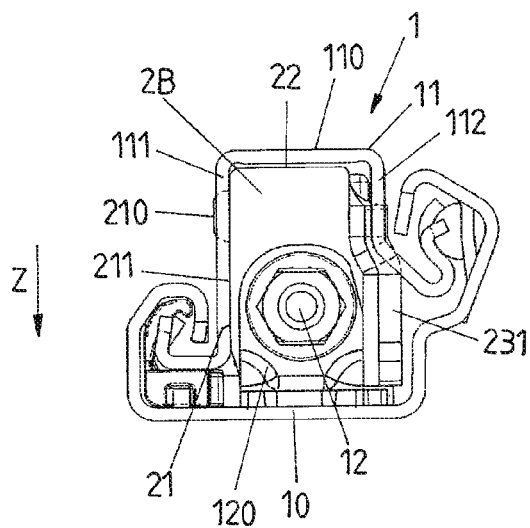
FIG. 21 shows a view into the adjustment device of the fifth embodiment, viewed along the longitudinal axis.

Subsequently, embodiments of the invention shall be described in detail with reference to the drawings. In the drawings, like reference numerals designate like structural elements.

It is to be noted that the embodiments shall not be limiting for the invention, but merely represent illustrative examples.

FIG. 26 shows an embodiment of an adjustment device 1 adapted to longitudinally adjust the position of a vehicle seat 3 (which is only schematically indicated in FIG. 26) relative to a vehicle floor 4 (which also is only schematically indicated in FIG. 26). By means of the adjustment device 1 the position of the vehicle seat 3 may be adjusted along a longitudinal axis L such that a user may slidably adjust his seating position within the vehicle.

The adjustment device 1, as generally known, comprises a first guide rail 10 which is directly or indirectly connected to the vehicle floor 4. A second, upper guide rail 11 is slidably arranged on the first guide rail 10 and may be moved relative to the first guide rail 10 along the longitudinal axis L along which both the first guide rail 10 and the second guide rail 11 extend. The vehicle seat 3 may be, directly or indirectly for example via a height adjustment mechanism, connected to the second, upper guide rail 11 such that by moving the second guide rail 11 relative to the first guide rail 10 the longitudinal position of the vehicle seat 3 may be adjusted.

The adjustment device 1 is constituted as an electric adjustment device for motorically adjusting the longitudinal position of the vehicle seat 3. For this, a spindle 12, via holding brackets 120, 121, is connected to a base 100 of the first guide rail 10 such that the spindle 12 is held relative to the first guide rail 10 in a torque-proof manner. The spindle 12 is received between legs 101, 102 of the generally U-shaped first guide rail 10, the second guide rail 11 being slidably arranged in between the legs 101, 102 of the first guide rail 10 using ball bearings or the like.

As schematically indicated in FIG. 27, a gearing 13 is fixed to the second guide rail 11 and is held in place with respect to the second guide rail 11 by means of two support members 2A, 2B being displaced with respect to each other along the longitudinal axis L and receiving the gearing 13 in between themselves. The gearing 13 comprises a housing 130 which is fitted in between the support members 2A, 2B and encloses a spindle nut 131 being in threaded engagement with a screw thread of the spindle 12 such that, by rotating the spindle nut 131, the gearing 13—and together with the gearing 13 the second guide rail 11—can be moved longitudinally along the spindle 12 in order to adjust the longitudinal position of the vehicle seat 3.

The gearing 13 furthermore comprises a drive worm 132 carrying a worm thread which engages with an outer toothing of the spindle nut 131 and may be driven by means of a drive device 14 in the shape of an electric motor in order to rotate the spindle nut 131 within the housing 130.

During operation, the drive device 14 electrically drives the drive worm 132, by which the spindle nut 131 is rotated about the spindle 12. Via the threaded engagement of an inner toothing of the spindle nut 131 with the outer toothing of the spindle 12, the gearing 13 is moved longitudinally along the spindle 12 such that the second guide rail 11 slides along the lower, first guide rail 10 and accordingly moves the vehicle seat 3 relative to the vehicle floor 4.

As schematically indicated in FIG. 27, the gearing 13 is held relative to the second guide rail 11 by means of a pair of support members 2A, 2B receiving the gearing 13 in between themselves. Embodiments of such support members 2A, 2B as they may be used in the adjustment device 1 generally illustrated in FIGS. 26 and 27 are shown in FIGS. 1 to 25 and shall be explained in the following.

A first embodiment of support members 2A, 2B is shown in FIGS. 1 to 5. The support members 2A, 2B are shaped as plate elements which, separately, are received in between legs 111, 112 of the generally U shaped second guide rail 11 such that they extend transversely with respect to the longitudinal axis L.

Each support member 2A, 2B comprises a support face 20 extending transversely within the second guide rail 11 and providing a support for the housing 130 of the gearing 13 received in between the support members 2A, 2B. In the support face 20 an opening 24 is formed through which the spindle 12 extends when the adjustment device 1 is assembled and ready for operation, as can be concluded from FIGS. 4 and 5.

Within the embodiment of FIGS. 1 to 5, each plate-like support member 2A, 2B is fixed to the second guide rail 11 via a first edge 21 of the support face 20, the first edge 21 facing a first leg 111 of the second guide rail 11.

Herein, the first edge 21 abuts the first leg 111 at its inside and, at a welding section 211, is connected to the inside of the first leg 111 by means of welding, in particular laser welding, in that welding seams 115A, 115B are formed, as indicated in FIG. 1. The welding seams 115A, 115B may for example be formed by welding from the outside, i.e., by directing a welding beam onto the outer face of the first leg 111 to generate a welding seam 115A, 115B at the inside of the first leg 111 in order to connect the first leg 111 to the respective support member 2A, 2B at the welding section 211 of the first edge 21.

In addition, a tab 210 protrudes from the first edge 21 and engages with an opening 114A, 114B of the first leg 111. By means of the tab 210, for each support member 2A, 2B a positive locking connection with the first leg 111 is formed at the first edge 21, hence providing for an additional fixation of the support member 2A, 2B to the first leg 111. By means of the tab 210 in particular shearing forces may be received for example in case of a vehicle crash.

Each support member 2A, 2B hence is connected to the second guide rail 11 via the first edge 21, the connection being achieved in a twofold manner, namely on the one hand by welding at the section 211 and on the other hand in a positive locking manner by means of the tab 210 engaging with a respective opening 114A, 114B of the first leg 111. The welding section 211 at which the welding seam 115A, 115B is formed herein is displaced along the vertical direction Z relative to the tab 210, such that the connections are formed at different locations on the first edge 21.

A second edge 22 of the plate-like support member 2A, 2B faces a base 110 of the second guide rail 11, the second edge 22 being placed with respect to the base 110 such that a gap is formed in between the second edge 22 and the base 110, as it is visible in FIG. 4. The support member 2A, 2B thus is not connected to the base 110 via the second edge 22.

In addition, a third edge 23 opposite the first edge 21 faces a second leg 112 opposite the first leg 111 and engages with a respective opening 116A, 116B of the second leg 112. The engagement herein is such that each support member 2A, 2B rests within the respective opening 116A, 116B with a play, when viewed along the longitudinal axis L, such that during normal operation the support member 2A, 2B at its third edge 23 is not in abutment with the second leg 112.

Because each support member 2A, 2B is connected to the guide rail 11 only via its first edge 21 during normal operation of the adjustment device 1, the stiffness characteristics of the guide rail 11 are not substantially altered by the support members 2A, 2B, but the guide rail 11 may be flexibly deformed at least to some extent during operation of the adjustment device 1. This may be beneficial in order to avoid the generation of unwanted noise during normal operation of the adjustment device 1.

In case of an abnormal load, for example in case of a crash, an additional support may be provided by the third edge 23 coming into contact with the second leg 112 of the second guide rail 11, the third edge 23 hence forming an end stop for preventing excessive deformation of the support member 2A, 2B with respect to the guide rail 11. In case of a crash, depending on the direction of load at least one of the support members 2A, 2B may abut the second leg 112 of the second guide rail 11, hence providing an additional support with respect to the guide rail 11 for reliably preventing a loosening of the gearing 13 in case of a crash.

In the first embodiment, a tab 230 is formed on the third edge 23, by which the support member 2A, 2B engages the respective opening 116A, 116B on the second leg 112 of the guide rail 11.

As visible in FIGS. 1 and 3, an opening 113 is formed in the first leg 111 of the guide rail 11. Via the opening 113 the electric drive device 14 is connected to the drive worm 132 for driving the spindle nut 131 of the gearing 13, as schematically is indicated in FIG. 27.

In a second embodiment shown in FIGS. 6 to 9 the location of the tab 210 with respect to the welding section 211 on the first edge 21 of each support member 2A, 2B is reversed. Whereas in the first embodiment of FIGS. 1 to 5 the welding section 211 is located at a section of the first edge 21 close to the base 110 of the guide rail 11 and the tab 210 is placed at a lower location at a far end of the first edge 21 remote from the base 110, the location of the welding section 211 and the tab 210 are reversed in the embodiment of FIGS. 6 to 9 such that the tab 210 of each support member 2A, 2B is arranged close to the base 110 and the welding section 211 is displaced in the vertical direction Z such that it is located at a lower end of the first edge 21.

Other than that the embodiment of FIGS. 6 to 9 is identical to the embodiment of FIGS. 1 to 5, such that it shall be referred to the explanations provided above with respect to the first embodiment, which identically apply also to the second embodiment.

The third embodiment of FIGS. 10 to 13 is identical to the second embodiment of FIGS. 6 to 9, wherein in addition each support member 2A, 2B is connected to the base 110 of the second guide rail 11 at its second edge 22.

For this, a tab 220 protruding from the second edge 22 engages with a respective opening 117A, 117B in the base 110 such that a positive locking connection between the support member 2A, 2B and the base 110 is formed. In addition, the second edge 22 is connected to the base 110 by means of a welding seam 118A, 118B formed for example by laser welding.

In this embodiment, hence, each support member 2A, 2B is connected to the second guide rail 11 via its first edge 21 and its second edge 22, wherein in addition the third edge 23 engages a respective opening 116A, 116B of the second leg 112 and at least during normal operation is arranged in the opening 116A, 116B with a clearance such that the third edge 23 does not rest against the second leg 112.

Other than the additional connection at the second edge 22 the third embodiment is identical to the second embodiment of FIGS. 6 to 9, such that it shall be referred also to the explanations above.

In a forth embodiment shown in FIGS. 14 to 17 each support member 2A, 2B is connected to the base 110 via the second edge 22, but is not connected to the first leg 111 via the first edge 21.

As visible for example from FIGS. 15 and 16, a tab 220 protrudes from the second edge 22 and engages with a respective opening 117A, 117B of the base 110, wherein in addition each support member 2A, 2B is welded to the base 110 by forming a welding seam 118A, 118B to connect the second edge 22 at a welding section 221 to the inside of the base 110.

In this embodiment, no connection is provided between the first edge 21 and the first leg 111. In particular, the first edge 21 may be arranged with respect to the first leg 111 such that a gap is formed in between the first edge 21 and the inside of the first leg 111 such that, during normal operation, the first edge 21 does not rest against the first leg 111.

With regard to the third edge 23 the embodiment of FIGS. 14 to 17 is identical to the embodiments described above, such that it also shall be referred to the above.

A fifth embodiment shown in FIGS. 18 to 21 is substantially identical to the second embodiment of FIGS. 6 to 9, wherein additionally each support member 2A, 2B comprises a planar section 231 extending at a perpendicular angle with regard to the support face 20 from the third edge 23. The planar section 231, during normal operation of the adjustment device 1, reaches into a respective opening 116A, 116B of the second leg 112 of the second guide rail 11, but is arranged in the opening 116A, 116B with a clearance such that each support member 2A, 2B does not rest against the second leg 112 during normal operation of the adjustment device 1. Only in case of abnormal load for example in case of a crash the guide rail 11 and/or the support member 2A, 2B may be deformed such that the planar section 231 comes into abutment with an edge surrounding the respective opening 116A, 116B such that an additional support and an end stop for the deformation movement is provided for strengthening the connection of the support member 2A, 2B with respect to the guide rail 11.

By providing the planar section 231 the additional support in case of a crash may be strengthened, because the planar section 231 may provide additional stability for each support member 2A, 2B.

A sixth embodiment shown in FIGS. 22 to 25 resembles the first embodiment of FIGS. 1 to 5, wherein in addition each support member 2A, 2B comprises a planar section 231 as in the embodiment of FIGS. 18 to 21. With respect to the connection of the support member 2A, 2B to the first leg 111 of the second guide rail 11 the embodiment behaves as described above for the embodiment of FIGS. 1 to 5. With regard to the connection of each support member 2A, 2B to the second leg 112 of the guide rail 11, the embodiment behaves as described above for the embodiment of FIGS. 18 to 21. It hence shall be referred to the explanations provided above.

The embodiments described herein shall not be limiting for the scope of the invention, but merely are provided for illustrative purposes. In general, the adjustment device may have a different shape and constitution than described herein without deviating from the scope of the invention.

Parts of the gearing may be formed from plastics. For example, the housing may be formed from plastics, a support of the gearing with respect to the guide rail being provided by means of one or multiple support members providing for a transfer of force between the gearing and the associated guide rail.

Support members of the kind described herein may be formed as metal parts for example by stamping. The stamping process may yield rounded edges of the plate-like support members, which potentially may ease the manufacturing of the support members and may also ease the installation of the gearing in between a pair of support members, because the formation of sharp edges on the support members is avoided (without the need to remove sharp edges in another manufacturing step) allowing to install the gearing in between the support members without facing the risk to damage parts of the gearing, for example plastic housing parts.

REFERENCE NUMERALS

1 Longitudinal adjustment device
10, 11 Guide rail
100, 110 Base
101, 102, 111, 112 Leg
113 Opening
114A, 114B Opening
115A, 115B Welding seam
116A, 116B Opening
117A, 117B Opening
118A, 118B Welding seam
12 Spindle
120, 121 Holding bracket
13 Gearing
130 Housing
131 Spindle nut
132 Drive worm
14 Drive device
2A, 2B Support member (plate element)
20 Support face
21 Edge
210 Tab
211 Welding section
22 Edge
220 Tab
221 Welding section
23 Edge
230 Tab
231 Planar section
24 Opening
3 Vehicle seat
4 Vehicle floor
L Longitudinal axis
Z Vertical direction

The invention claimed is:
1. An adjustment device for adjusting a longitudinal position of a vehicle seat, comprising:
a first guide rail;
a spindle fixed to the first guide rail and extending along a longitudinal axis;
a second guide rail being linearly movable along the longitudinal axis with respect to the first guide rail, the second guide rail having a base and a first leg extending from the base;
a gearing fixed to the second guide rail and having a housing, the gearing being in operative connection with the spindle to move the second guide rail relative to the first guide rail;
at least one support member arranged on the second guide rail, the at least one support member having a support face extending transversely to the longitudinal axis and facing the housing of the gearing for supporting the gearing with respect to the second guide rail;
wherein the support face comprises a first edge facing the base or the first leg and having a welding section via which the first edge is fixed to the base or the first leg by welding, a tab protruding from said first edge and engaging with an opening of said base or said first leg.

2. The adjustment device according to claim 1, wherein the at least one support member comprises two support members fixed to the second guide rail and being displaced with respect to each other along the longitudinal axis, the two support members accommodating the gearing between them.

3. The adjustment device according to claim 1, wherein the welding section of the first edge is fixed to the base or the first leg by laser welding.

4. The adjustment device according to claim 1, wherein the tab protruding from the first edge is, via the opening, in a positive locking engagement with the base or the first leg.

5. The adjustment device according to claim 1, wherein said first edge faces the first leg of the second guide rail, the welding section of the first edge being fixed to the first leg by welding and the tab protruding from the first edge engaging with an opening of the first leg.

6. The adjustment device according to claim 5, wherein the welding section of the first edge and the tab protruding from the first edge are displaced with respect to each other along a vertical direction extending transverse to the longitudinal axis and transverse to the base.

7. The adjustment device according to claim 5, wherein the support face comprises a second edge facing the base, wherein the second edge is arranged with respect to the base such that a gap is formed in between the second edge and the base.

8. The adjustment device according to claim 5, wherein the support face comprises a second edge facing the base, the second edge having a welding section via which the second edge is fixed to the base by welding, a tab protruding from the second edge and engaging with an opening of the base.

9. The adjustment device according to claim 1, wherein the second guide rail comprises a second leg extending from the base in parallel to the first leg, wherein the support face comprises a third edge facing the second leg and engaging with an opening of the second leg.

10. The adjustment device according to claim 9, wherein the third edge, when viewed along the longitudinal axis, rests in said opening of the second leg with a play such that the third edge does not abut the second leg in a state of normal operation of the adjustment device, but comes into contact with the second leg in a state of abnormal load.

11. The adjustment device according to claim 9, wherein a tab protrudes from the third edge and engages with said opening of the second leg.

12. The adjustment device according to claim 9, wherein the at least one support member comprises a planar section extending from the third edge perpendicularly to the support face and engaging with said opening of the second leg.

* * * * *